United States Patent
Sun et al.

(10) Patent No.: US 11,277,411 B2
(45) Date of Patent: Mar. 15, 2022

(54) DATA PROTECTION AND PRIVACY REGULATIONS BASED ON BLOCKCHAIN

(71) Applicant: SAP SE, Walldorf (DE)

(72) Inventors: Xun Sun, Shanghai (CN); Jianmin Xue, Shanghai (CN)

(73) Assignee: SAP SE, Walldorf (DE)

( * ) Notice: Subject to any disclaimer, the term of this patent is extended or adjusted under 35 U.S.C. 154(b) by 601 days.

(21) Appl. No.: 16/218,935

(22) Filed: Dec. 13, 2018

(65) Prior Publication Data

US 2020/0195647 A1 Jun. 18, 2020

(51) Int. Cl.
| | |
|---|---|
| G06F 21/60 | (2013.01) |
| H04L 29/06 | (2006.01) |
| G06F 16/182 | (2019.01) |
| H04L 9/08 | (2006.01) |
| G06F 16/23 | (2019.01) |
| G06F 21/62 | (2013.01) |
| H04L 9/06 | (2006.01) |

(52) U.S. Cl.
CPC .......... *H04L 63/10* (2013.01); *G06F 16/1824* (2019.01); *G06F 16/2358* (2019.01); *G06F 21/62* (2013.01); *H04L 9/0643* (2013.01); *H04L 9/0819* (2013.01); *H04L 63/0807* (2013.01); *H04L 2209/38* (2013.01)

(58) Field of Classification Search
CPC ....... H04L 63/10; H04L 9/08; H04L 63/0807; H04L 9/0819; H04L 9/0643; H04L 2209/38; G06F 21/62; G06F 21/6218; G06F 16/1824; G06F 16/2358
USPC ............ 713/183, 189; 726/2, 5, 27; 707/705
See application file for complete search history.

(56) References Cited

U.S. PATENT DOCUMENTS

2017/0364701 A1* 12/2017 Struttmann ......... G06F 16/2282

* cited by examiner

*Primary Examiner* — Izunna Okeke
(74) *Attorney, Agent, or Firm* — Mintz, Levin, Cohn, Ferris, Glovsky and Popeo, P.C.

(57) ABSTRACT

Described herein includes a data controller that secures personal data and efficiency and reliably records data access events using blockchain. The system may include a data controller for: receiving a request to access data stored in a database on the data controller, the request including a web token; verifying the web token of the request; providing access to the data stored in the database; generating a data access event indicating that the data stored in the database has been accessed; and recording the data access event on a blockchain platform in accordance with blockchain.

15 Claims, 8 Drawing Sheets

DATA PROTECTION AND PRIVACY REGULATIONS BASED ON BLOCKCHAIN

FIELD

The subject matter described herein relates generally to securing personal data and, more specifically, to providing secure and efficient data access and data access event recordation using a central data controller supported by blockchain.

BACKGROUND

Companies may purchase software solutions from multiple vendors or software applications to support its operations. Each software solution or application may implement different approaches to secure personal data and to comply with various data privacy laws, such as recording when the personal data is accessed (e.g., created, modified, read, and/or deleted). Accordingly, if personal data is accessed, the operation would need to be repeated by each customer across each separate vendor or software application, resulting in a fragmented, burdensome, unreliable, and error prone approach.

SUMMARY

In some implementations, methods and apparatus, including computer program products, are provided for optimizing personal data management and data access event recordation that address the unreliability of securing personal data and the fragmented approach to recording data access events used by current data management systems.

In some implementations, there may be provided a method which may include: receiving, by a data controller and via a frontend interface associated with an application server, a request to access data stored in a database on the data controller. The request may include a web token. The method may further include verifying, by the data controller, the web token of the request. The method may also include providing, by the data controller and via the frontend interface, access to the data stored in the database. The method may also include generating, by the data controller, a data access event indicating that the data stored in the database has been accessed. The method may further include recording, by the data controller, the data access event on a blockchain platform in accordance with blockchain. The blockchain platform may be in remote communication with the data controller.

In some variations, one or more of the features disclosed herein including the following features can optionally be included in any feasible combination. The method may further include: receiving, by the data controller, a reporting request to generate a data access event report. The data access event report may include a log of the data access event stored on the blockchain platform. The method may also include generating, by the data controller in response to the reporting request, the data access event report.

In some examples, the data access event indicates that the data has been one or more of read, modified, written, and deleted.

In other examples, the generating may include retrieving, by the data controller, the data access event from the blockchain platform. The generating may also include retrieving, by the data controller, the data from the database that corresponds to the retrieved data access event.

In some examples, the data stored in the database on the data controller includes a data object comprising an identifier. The blockchain of the data access event may include the identifier. The identifier may link the data object to the corresponding data access event.

In other examples, the application server may include an application key. The web token may be generated by the data controller after verifying that the application key matches a stored application key that is stored on the data controller.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
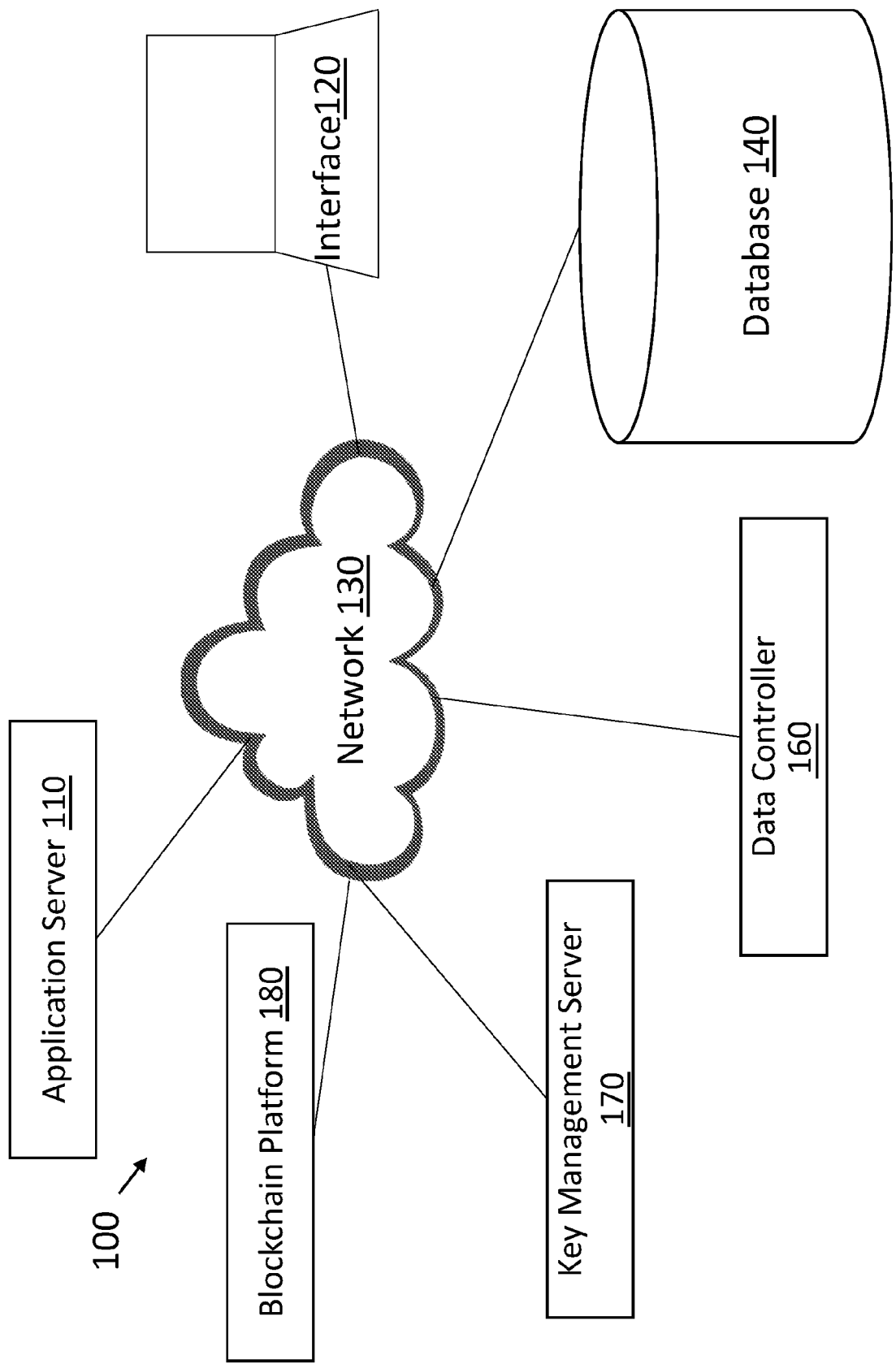
FIG. 1 depicts a system diagram illustrating a data management system consistent with some implementations of the current subject matter.

This document describes a data management system for improving integration of various users and applications to secure personal data and to record data access events in data management systems on a network. The data management system described herein may secure personal data via various authentication and/or authorization methods, and/or may securely and efficiently record and provide access to data access event records via a blockchain platform.

In a cloud-based enterprise landscape, in which a multitude of users are connected over a network, data security for customers' confidential data is essential. Data security, auditing, memory management of resources, and/or efficient system architecture are just some of the factors that need to be addressed. Moreover, such factors may need to be addressed while implementing general data protection regulation (GDPR). Thus, providing secured access to a user's confidential data, especially when there are a large number of users from different applications, presents a number of challenges. For example, in such environments, a user's data needs to be securely protected while also easily and quickly accessible and shared among verified users. It is also of interest to maintain records of and/or track modifications made to the data.

For example, in the enterprise landscape, companies purchase software solutions (e.g., SaaS and/or on-premise) or applications (e.g., HR systems, sales systems, travel and expense systems, physical security systems, and the like) from multiple vendors to support its operations. Each software solution and vendor may take different approaches to complying with GDPR, thereby making the approaches difficult to operate in a uniform manner. In particular, if one user's data is created, modified, and/or deleted, the operation to do so may need to be replicated in all relevant software solutions across the entire enterprise landscape. Ensuring consistency of data security and synchronization across all software solutions may be burdensome and error prone, as customers attempt to consistently create, modify, and/or delete the user's data in each software solution provided by each separate vendor.

Consistent with some implementations, a data controller provides a uniform and central interface that implements an API-based architecture to communicate and be integrated with each of the multiple applications. The data controller, may for example, integrate with the enterprise system landscape to securely and reliably handle personal data. The database controller may maintain a secure connection with each of the applications using various authentication and authorization methods. For example, in order for each application to communicate with the platform, the application may be authenticated and authorized using an application key during initial application onboarding, and a web token for authentication and authorization during subsequent requests to communicate with the platform.

The data controller may also store personal data, shared by each of the applications across the different vendors, in a master database. The data controller may securely record personal data access events (e.g., when personal data is created, modified, read, and/or deleted) via a blockchain platform, which provides a central ledger, making enterprise-wide reporting easier, simpler, and more consistent.

The blockchain platform may communicate with the master database stored on the data controller via one or more unique object identifiers. When personal data is accessed, the personal data access event may be recorded in the blockchain platform, rather than separately in each application across the different vendors. The data controller may reduce errors and improve reliability in personal data access event recordation, and more speedily provide audit logs showing the recorded access events, by at least providing a central and secure location for the personal data access events to be recorded. Accordingly, the data controller consistent with implementations of the current subject matter may provide for easier compliance with data privacy laws, such as GDPR, and provide a more secure platform for recording data access events. In some implementations, the blockchain platform may be instantiated with a blockchain service, such as SAP Blockchain Service.

FIG. 1 depicts a network block diagram illustrating a data management system 100 consistent with some implementations of the current subject matter. The data management system 100 may include one or more frontend interfaces (e.g., clients) 120, a database 140, a wired and/or wireless network 130, and one or more servers, including an application server 110, a data controller 160, a key management server 170, and a blockchain platform.

The data controller 160 may communicate with the application server 110, the blockchain platform 180, and the key management server 170 to provide a single platform for reliably and consistently communicating with various applications, securing personal data, and more speedily tracking data access events. For example, the data controller 160 may provide a central component of the data management system 100 where personal data within an enterprise is stored and/or managed. In some implementations, changes to personal data are made through the data controller 160.

The one or more clients 120 may be any device that includes at least one processor and at least one memory including program code. For example, the client 120 may be a computer, a tablet, a mobile device, a smart phone, and/or a wearable device. The client 120 may be any data collection device configured with network connectivity. In some implementations, the client 120 may receive code or other software from a user via a display screen. For example, the user may send a request to access (e.g., read, modify, write) data via the application server 110 in communications with the one or more clients 120. The application server 110 may include one or more application servers representing each application (e.g., HR system, finance system, sales system, purchasing system, and the like).

The one or more clients 120 may receive one or more instructions and/or commands from the user for executing the request to access data. The client 120 may further receive one or more instructions and/or commands, submitted via the display screen, to request to access the data via the client 120. According to some implementations, the data management system 100 may be configured to respond to commands and/or instructions received via the client 120 to request to access data and/or generate data access logs.

The key management server 170 may manage keys or identifiers used for securing personal data and/or restricting access to the data controller 160. The blockchain platform 180 may provide a central distributed ledger for maintaining data access event records across one or more applications in the enterprise. To comply with GDPR, and other regulations, a user may need to provide the data access event records. The blockhain platform 180 may quickly and securely provide the data access event records.

As mentioned above, the personal data may be stored and/or managed by the data controller 160. The data controller 160 may store read and/or write data calculated and/or stored in one or more data tables. The data tables may be stored in the database 140, which may include a database management system (DBMS) that is coupled with an in-memory database, a relational database, and/or any other types of persistence. The database 140 may form a part of the data controller 160 and/or remotely communication with the data controller 160.

Referring to FIG. 1, the application server 110, the data controller 160, the key management server 170, and the blockchain platform may be communicatively coupled with the one or more clients 120, and/or the database 140 via the wired and/or wireless network 130. The wired and/or wireless network 130 may be a public land mobile network (PLMN), a local area network (LAN), a virtual local area network (VLAN), a wide area network (WAN), a point-to-point link, the Internet, and/or the like.

Figure 2:
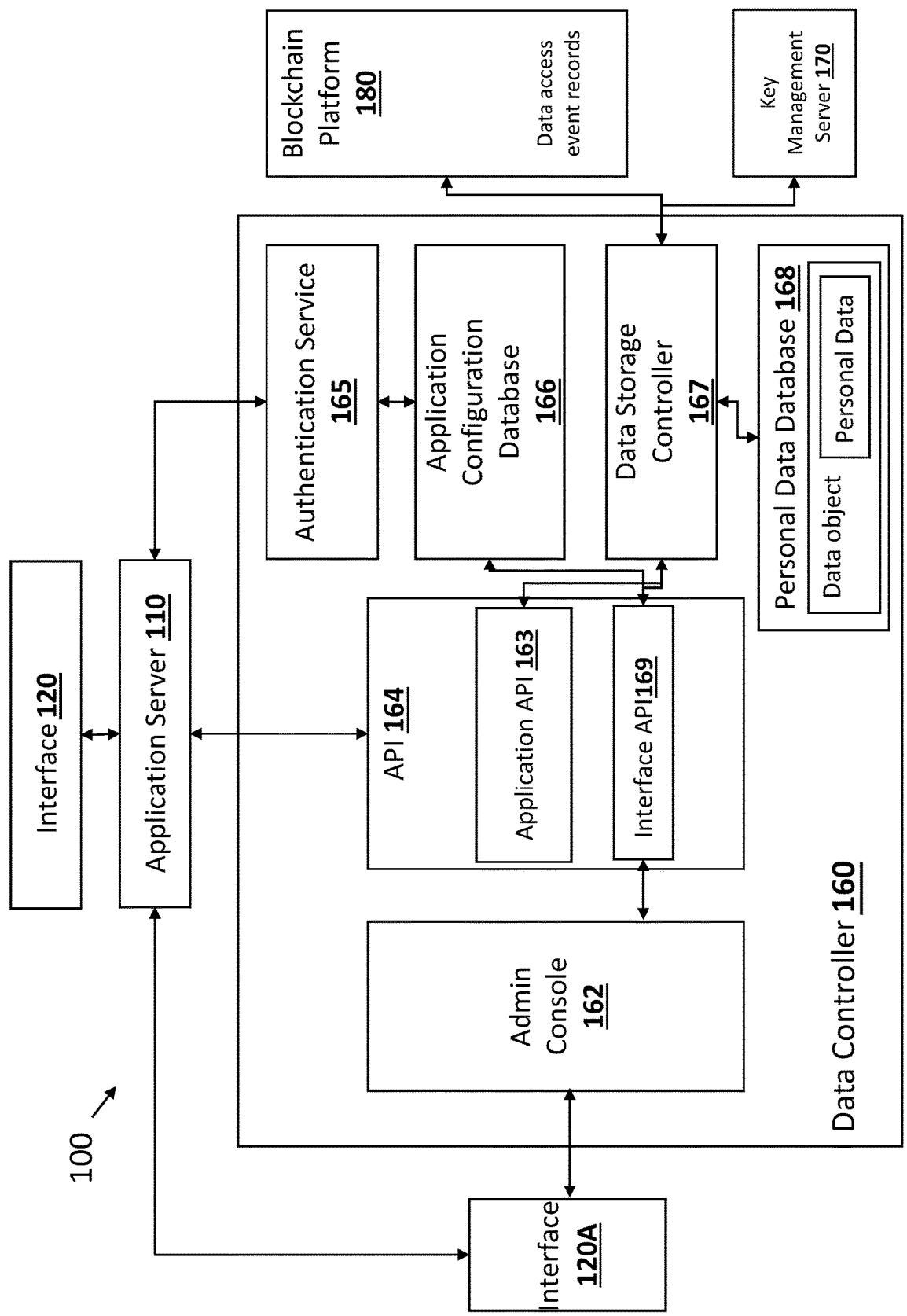
FIG. 2 depicts a detailed system diagram illustrating a data management system consistent with some implementations of the current subject matter.

FIG. 2 depicts a block diagram illustrating an example of the data management system 100 including the application server 110, the data controller 160, the key management server 170, and the blockchain platform consistent with some implementations of the current subject matter.

In some implementations, the data management system 100 includes one or more frontend interface (e.g., client) 120, such as frontend interface (e.g., client) 120 and frontend interface (e.g., client) 120A shown in FIG. 2, through which one or more users or types of users may interact with the data controller 160 and/or other components of the data management system 100. In some implementations, the client 120 provides an interface that may be used by one or more application users. The application users may include end users that use applications, such as software applications or solutions, (e.g., HR systems, sales systems, travel and expense systems, physical security systems, and the like).

In some implementations, the client 120A may provide an interface that may be used by one or more users, including an application administrator and a data protection officer or other user responsible for meeting regulation requirements, among others. The application administrator may be responsible for initiating an application onboarding process via the client 120A and managing applications that communicate with the data controller 160 for managing and securing personal data. The data protection officer may be responsible for initiating a request to generate a data access event report (as described below) via the client 120A.

As noted above, the data controller 160 may securely store personal data of various users as a data object. The data object may be stored in the personal data database 168 on the data controller 160. For example, each user may be represented and/or organized in JavaScript Object Notation (JSON), among other object types, as a JSON object. An example of a portion of the personal data represented as a data object (e.g., stored in the JSON format) is as follows:

```
{
    'firstName': ['Xun'],
    'lastName': ['Sun'],
    'email': ['first.last@example.com'],
    'job': ['Software Engineer'],
    'ssn': {
        'sensitive': 'true',
        'value': ['123456']
    },
    'bankAccount': {
        'sensitive': 'true',
        'value': ['123456']
    }
}
```

The data object may include one or more user attributes, which represent the personal data stored in the data controller 160 for each user. In the above example, the one or more user attributes for the user Xun Sun includes a first name, a last name, an email, a job, a social security number (SSN), and a bank account.

In the data object, each of the one or more user attributes may include a single value. Additionally, or alternatively, each of the one or more user attributes may include an array of values, indexed by a version number. Since the one or more user attributes may be modified, existing versions of each of the one or more user attributes in each data object may be stored as an array in the data object. Storing each of the versions of the one or more user attributes may improve the ease of logging changes to personal data in the blockchain platform 180.

In some implementations, each of the one or more user attributes may be specified as sensitive according to organizational needs. As shown in the above example data object portion, the user's SSN and bank account have been marked as sensitive. In some implementations, the data object and the personal data stored and/or represented in the data object may be accessible to authenticated users as described in more detail below, and may be represented by an identifier, including a unified unique ID (UUID).

The personal data stored in the data objects may be secured in the data controller 160 and when the personal data is accessed. For example, the personal data may be encrypted when stored in the personal data database 168. When the personal data is provided to the users and/or applications, the personal data may be protected using TLS and/or other types of encryption. In some implementations, when the personal data is used by the applications and/or users, the personal data may be protected with access control such that the requests to access data made by the applications via the application server may be authorized and/or authenticated.

The data controller 160 may desirably include one or more authentication and authorization features, which may allow access to the data objects and personal data stored in the data object. In some implementations, the data controller 160 may provide role-based permissions for authorization. For example, in some implementations, the data controller 160 may include one or more authentication and/or authorization features that allow certain types of users, such as an application administrator and/or a data privacy officer, to access the data objects and/or personal data stored in the data objects, via the client 120A. The data controller 160 may include an admin console 162 that communicates with the client 120A and allows access to the data objects stored on the data controller 160.

In some implementations, the data controller 160 may include one or authentication and/or authorization features for authorizing one or more applications (software or applications) via the application server 110 in communication with the client 120 after a request from the application to access data stored on the data controller 160. For example, the applications may be authenticated using an application key (stored in the application configuration database 166) received by the application server 110 from the authentication service 165 of the data controller 160, during application onboarding. Upon successful authentication of the application using the application key, the application receives a web token (e.g., a JSON Web Toke (JWT)) from the authentication service 165. The application may use the web token for authenticating and authorizing subsequent requests to access data stored on the data controller 160.

To streamline the onboarding process for and to unify development of applications, the data controller 160 may implement an API-based architecture to communicate with various types of applications via the application server 110 in communication with the client 120. For example, the data controller 160 may include one or more application programming interfaces (APIs) 164. The APIs 164 may allow for the applications to be quickly developed against the same set of APIs.

The APIs 164 provide a uniform platform for communication with each of the different applications. The APIs 164 may include one or more APIs, including an application API 163 for communicating with the various applications via the one or more application servers 110 to onboard, manage, and offboard applications, and a frontend interface (e.g., client) API 169 for communicating with certain users (e.g., application administrator, data privacy officer, etc.) to enable access to the personal data of the data objects stored on the data controller 160 and/or to generate one or more reports showing the data access events (e.g., for GDPR reporting).

Consistent with implementations of the current subject matter, an auditing method, such as blockchain, is used to record activity related to personal data access. For example, the blockchain platform 180 consistent with implementations of the current subject matter may record one or more data access events (e.g., when personal data is created, read, modified, deleted, etc.), and distribute the data access events across the network 130 within an organization. The blockchain may protect the data access events from being accessed from unauthorized and/or unauthenticated users and applications and/or by users outside the organization. In some implementations, the blockchain platform 180 may quickly generate a report and/or log of the one or more data access events.

Blockchain is a decentralized distributed ledger that is used to record transactions. Each block in a chain is addressed by a unique hash value, and integrity between blocks is maintained by storing the hash values of previous blocks in new blocks. That is, each block has two values: a self-hash value (the block's own hash value) and previous hash value (the previous block's hash value). The initial block (the genesis block) has only its self-hash value and no previous hash value. The second block has its self-hash value and the previous hash value which is the hash value of the genesis block. And so on with the following blocks. By holding these values, the blocks stay interconnected and maintain integrity.

The blocks in the blockchain of the blockchain platform 180 may also include additional details regarding the data access events, such as a timestamp (e.g., time of the data access event), operation (e.g., type of data access event), subject (e.g., who initiated the data access event), object (e.g., the data object being accessed, including the user attributes and values being accessed), and the like.

In some implementations, the blocks in the blockchain of the blockchain platform 180 may include certain details for certain types of data access events. For example, for a personal data creation data access event, the details may include the object identifier or UUID. For a personal data modification data access event, the details may include the object UUID, the one or more user attributes of the personal data being modified, old version number, and new version number. In some implementations, for a personal data read data access event, the details may include the object UUID, the one or more user attributes being read by the user and/or application, and the old and new version numbers. In some implementations, for the personal data delete data access event, the details may include the UUID.

In some implementations, the blockchain platform 180 may communicate with the personal data database 168 of the data controller 160 via the data storage controller 167.

Figure 3:
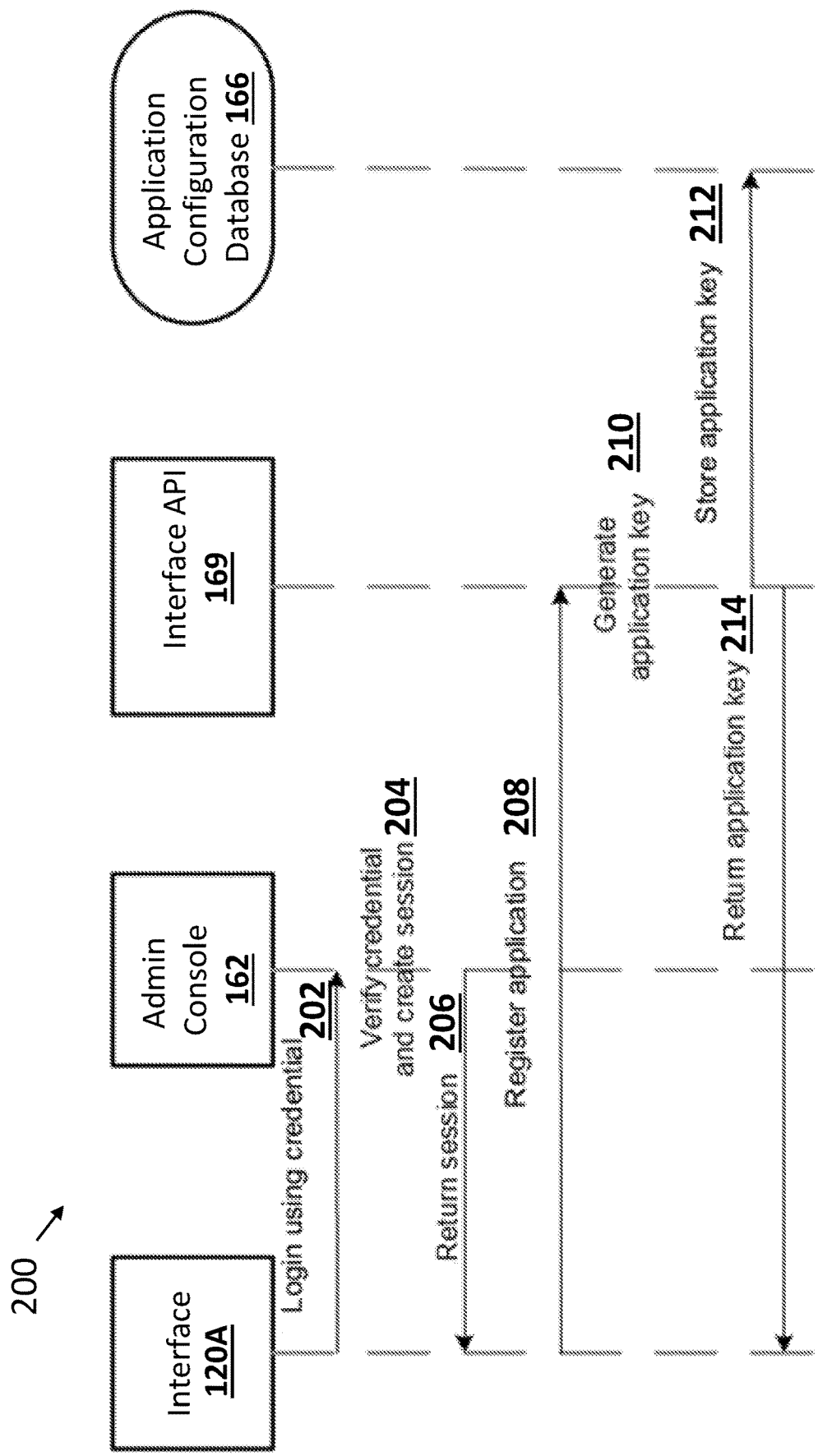
FIG. 3 depicts a flowchart illustrating a process for onboarding an application to a data controller consistent with some implementations of the current subject matter.

FIG. 3 shows a process flow chart 200 illustrating features of a process consistent with one or more implementations of the current subject matter, for application and/or user onboarding. For example, an application may be securely registered with the data controller 160 to be able to access the personal data stored on the data controller 160.

At 202, the admin console 162 may receive a request to log into the data controller 160 from a user, such as an application administrator, via the client 120A, using a login credential. At 204, the admin console 162 may verify the login credential. If the admin console 162 verifies the login credential, the data controller 160 creates a session for user authentication and/or authorization. However, if the admin console 162 does not verify the login credential, the login attempt fails, ending the session.

At 206, a session cookie is returned to the local browser at the client 120A. Once the session is created and the client 120A receives the session cookie, the admin console 162 may, at 208, register the user/client 120A using an API, such as an API from the one or more APIs 164. For example, the admin console 162 of the data controller 160 may register the user/client 120A using the client API 169 (e.g., an application admin API).

In some implementations, to register the user/client 120A, the client API 169 may generate an application key, at 210, and may store the application key in the application configuration database 166, at 212. At 214, the client API 169 returns the application key to the user/client 120A via the admin console 162. In some implementations, the user, via the client 120A, may store the application key with the corresponding application via the application server 110.

Figure 4:
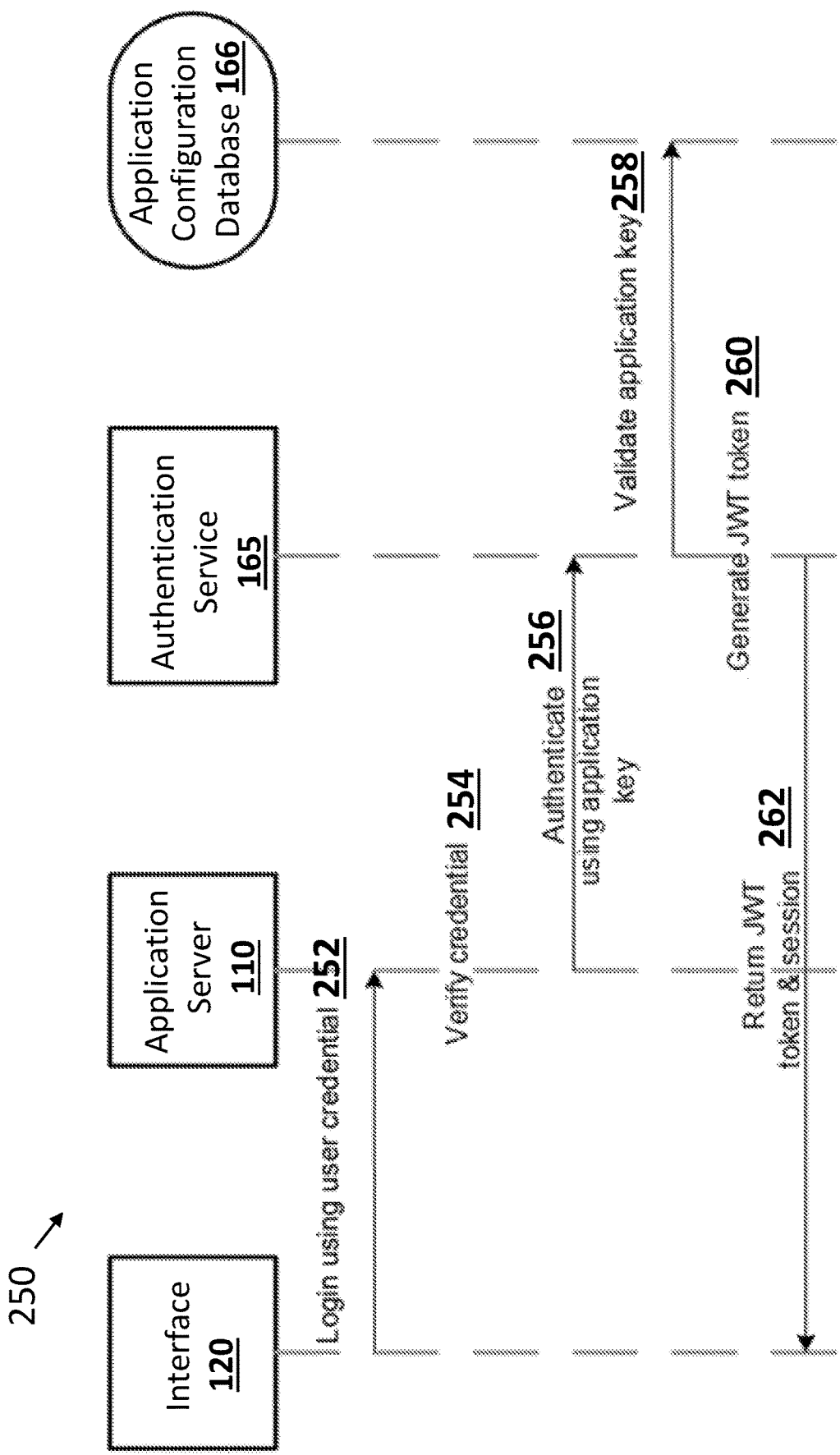
FIG. 4 depicts a flowchart illustrating a process for authenticating to a data controller consistent with some implementations of the current subject matter.

FIG. 4 shows a process flow chart 250 illustrating features of a process consistent with one or more implementations of the current subject matter, for application and/or user login. For example, an application may be securely logged into the data controller 160 to be able to access the personal data stored on the data controller 160.

At 252, the application server 110 of an application may receive a request to login, via the client 120. For example, the application server 110 may receive one or more login credentials along with the request to log in. At 254, the application server 110 may verify the received login credentials. If the application server 110 does not verify the login credentials, the application server 110 may reject the login request.

At 256, the authentication service 165 may receive a request to authenticate and/or authorize the application via the application server 110. The request to authenticate and/or authorize the application may include a user ID and the application key (which may have been generated by the client API 169 as discussed above).

At 258, the authentication service 165 of the data controller 160 may determine whether the authentication key received as part of the request to authenticate and/or authorize is valid. For example, the authentication service 165 may reference the authentication configuration database 166 to determine whether the authentication key stored in the application configuration database 166 matches the application key received.

If the authentication service 165 determines that the application keys do not match, the authentication service may reject the login request.

If the authentication service 165 determines that the application keys match, the authentication service 165 may accept the login request. For example, at 260, the authentication service 165 may generate a web token (JWT token) for the current user login, authenticating the current session, and allowing the user to access the personal data stored on the data controller 160. The web token provides an additional layer of security to protect the personal data of the data objects stored on the data controller 160.

In some implementations, the web token may be valid for a limited amount of time. For example, the web token may include a time of issuance and a time of expiration.

At 262, the authentication service 165 may return the web token and session cookie to the client 120 via the application server 110 to allow the user, via the client 120, to access the personal data on the data controller 160.

Figure 5:
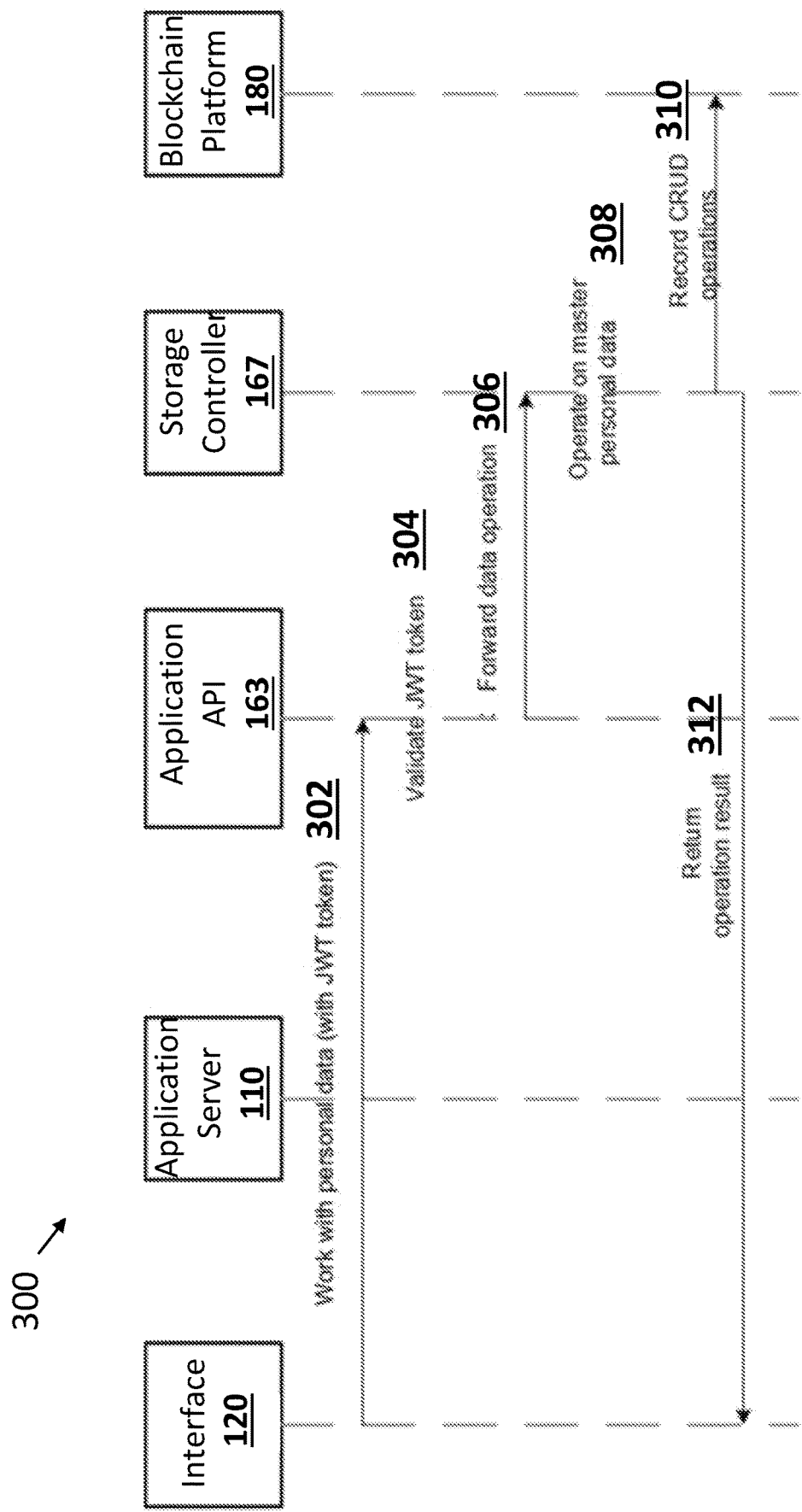
FIG. 5 depicts a flowchart illustrating a process for recording data access events to a blockchain platform consistent with some implementations of the current subject matter.

FIG. 5 shows a process flow chart 300 illustrating features of a process consistent with one or more implementations of the current subject matter, for providing additional security for the data controller 160, to allow for more protected access to the personal data stored on the data controller 160.

At 302, API 164, such as the application API 163, receives a request from the application server 110, via the client 120 (e.g., from the application and/or user of the application), to access (e.g., read, modify, write, delete, etc.) personal data stored on the data controller 160. The request to access personal data may include a web token, an application ID, and a user ID. As noted above, the web token may be generated by the authentication service 165 and returned to the application via the application server 110 and client 120, for example, when the authentication service 165 determines that the authentication key received by the authentication service 165 from the application server 110 matches the authentication key stored in the application configuration database 166.

At 304, at least one of the APIs 164, such as the application API 163, may verify the web token to authorize the request to access data. In some implementations, the API 163 may additionally or alternatively verify the application ID and/or the user ID.

The application API 163 may reject the request to access data if, for example, the application API 163 does not verify the web token, the web token is expired, and/or the authorization check fails. The application API 163 may approve the request to access data if, for example, the application API 163 verifies the web token.

At 306, at least one of the APIs 164 may forward the request to access data to the data storage controller 167 (e.g., the data storage controller 167 receives the request to access data via at least one of the APIs 164), upon web token verification, indicating that the request to access data has been authorized and/or authenticated. At 308, the data storage controller 167 may communicate with the personal data database 168 to record any additions, deletions and/or modifications to the personal data of the data objects stored in the personal data database 168. In some implementations, if the personal data is updated, the version of the one or more user attributes of the personal data in each data object may be incremented.

At 310, the data storage controller 167 may communicate with the blockchain platform 180. For example, since the request to access data has been authorized and/or authenticated, the user/application may access the data via the client 120 at the data controller 160. As a result, the data storage controller 167 may record the data access event (along with details of the data access event), to the blockchain of the blockchain platform 180.

At 312, the data access event may be returned to the application/user via the application server 110 and the client 120.

FIG. 5 shows a process flow chart 350 illustrating features of a process consistent with one or more implementations of the current subject matter. In some implementations, logs of the data access events may be quickly and easily generated by the data controller 160, based on at least the data access events stored in the blockchain platform 180. For example, reports including the data access events may be generated and provided to comply with regulations, such as GDPR.

At 352, the admin console 162 may receive a login request from a user (e.g., a data admin) via the client 120A. At 354, the admin console 162 may verify the login credentials received as part of the login request, consistent with methods described herein. If the credential is verified, the admin console 162 may begin the data access session, authorizing the user via the client 120A to access the personal data on the data controller 160. At 356, the admin console 162 may return the session to the user via the client 120A.

At 358, at least one of the APIs 164, such as the client API 169 (e.g., a data privacy officer API), may receive a request to generate a data access event report. The data access event report may include a read access log, a data subject information log, and/or a change log, among others.

At 360, at least one of the APIs 164 may forward the request to generate a data access event report to the data storage controller 167 (e.g., the data storage controller 167 receives the request to generate a data access event report via at least one of the APIs 164). The data storage controller 167 may, at 362, communicate with the blockchain platform 180 to generate the data access event report, at least in part by retrieving one or more data access event records stored in the blockchain of the blockchain platform 180.

Additionally and/or alternatively, the data storage controller 167 may, at 364, communicate with the personal data database 168 to generate the data access event report, at least in part by retrieving one or more personal data records from the personal data database 168. The personal data records retrieved by the data storage controller 167 to generate the data access event reports may correspond to the data access event records retrieved by the data storage controller 167, by, for example, matching the identifier or UUID stored in the data access event records with the corresponding identifier or UUID stored in the personal data database 168.

At 368, at least one of the APIs 164, such as the client API 169, receives the data access event records and/or the personal data retrieved by the data storage controller 167 (e.g., the data storage controller 167 forwards the data access event records and/or the personal data to the APIs 164). At 370, the client API 169 may generate the data access event report, at least in part by compiling the data access event records and/or the personal data records received from blockchain platform 180 and/or the personal data database 168, via the data storage controller 167.

At 372, the client API 169 may return the generated data access event report to the client 120A for access by the user.

Figure 6:
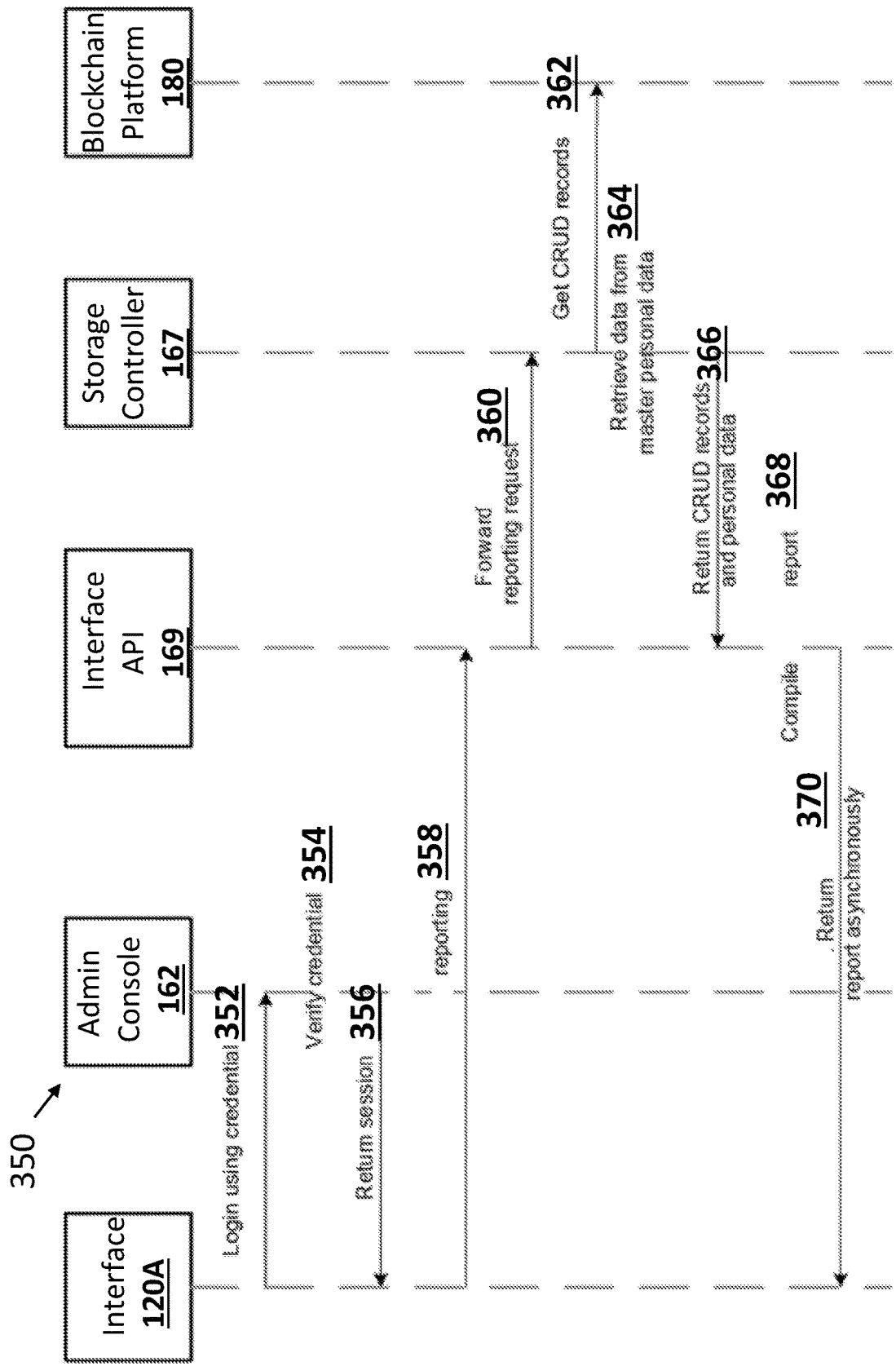
FIG. 6 depicts a flowchart illustrating a process for generating a data access event report by a data controller consistent with some implementations of the current subject matter.

FIG. 6 shows a process flow chart 400 illustrating features of a process consistent with one or more implementations of the current subject matter, for offboarding an application to ensure that the personal data controller 160 remains secure.

At 402, the admin console 162 may receive a login request from a user (e.g., a data admin) via the client 120A. At 404, the admin console 162 may verify the login credentials received as part of the login request, consistent with methods described herein. If the credential is verified, the admin console 162 may begin the data access session, authorizing the user via the client 120A to access the personal data on the data controller 160. At 406, the admin console 162 may return the session cookie to the user via the client 120A to begin the session.

At 408, at least one of the APIs 164, such as the client API 169 (e.g., a data administrator API), may receive a request, via the admin console 162 in communication with the client 120A, to unregister the corresponding application. Unregistering applications that should not have access to the personal data stored in the data controller 160 may help to improve data security.

At 410, the client API 169 may remove the application key corresponding to the application from the application configuration database 166. At 412, the client API 169 may return the offboarding status indicating that the application key has been removed, to the user via the admin console 162 of the data controller 160, via the client 120A. Once the application key has been removed, the application would need to obtain a new application key to regain access to the data controller 160, consistent with methods described herein.

Figure 7:
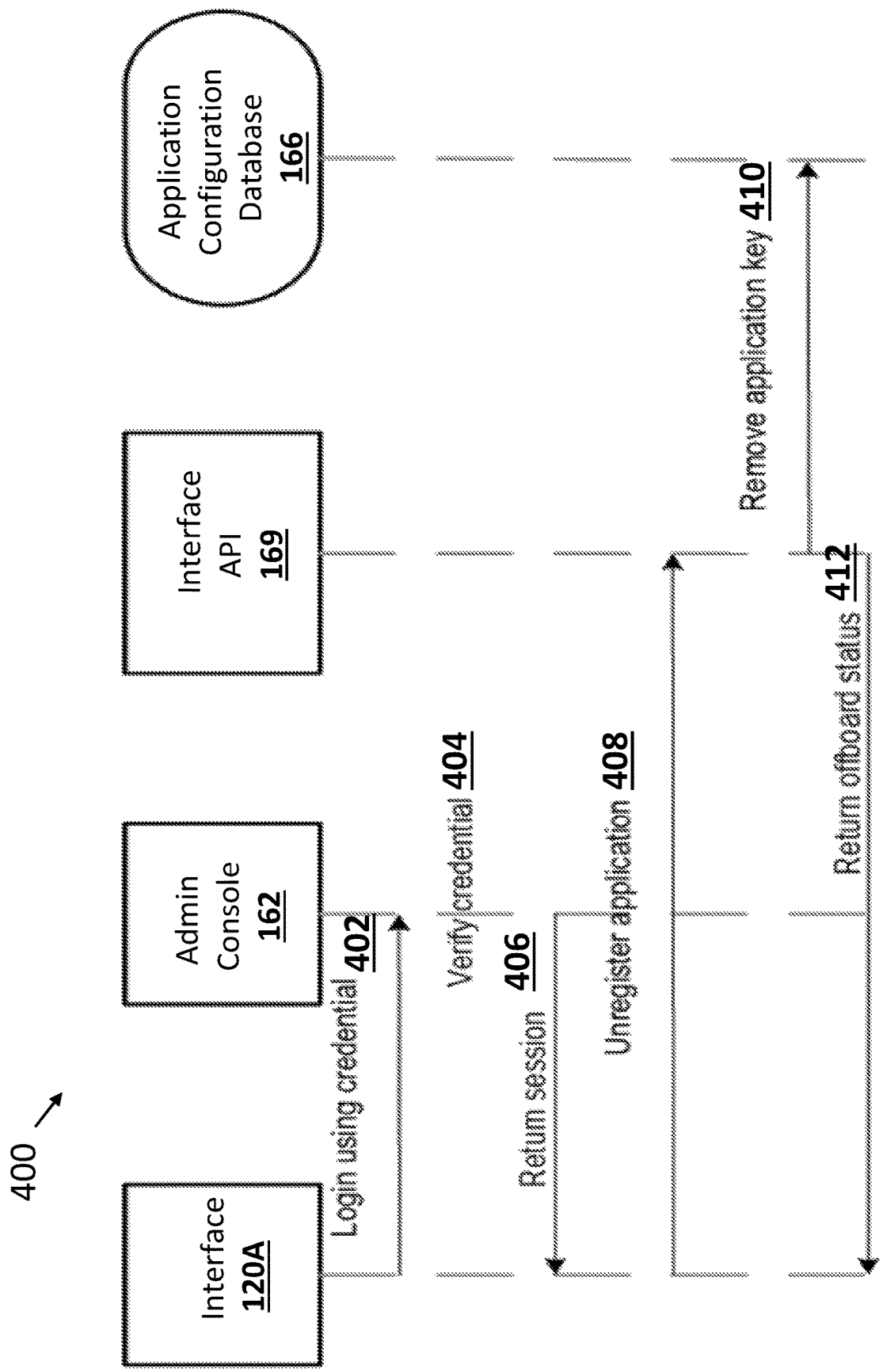
FIG. 7 depicts a flowchart illustrating a process for offboarding an application to a data controller consistent with some implementations of the current subject matter.
Figure 8:
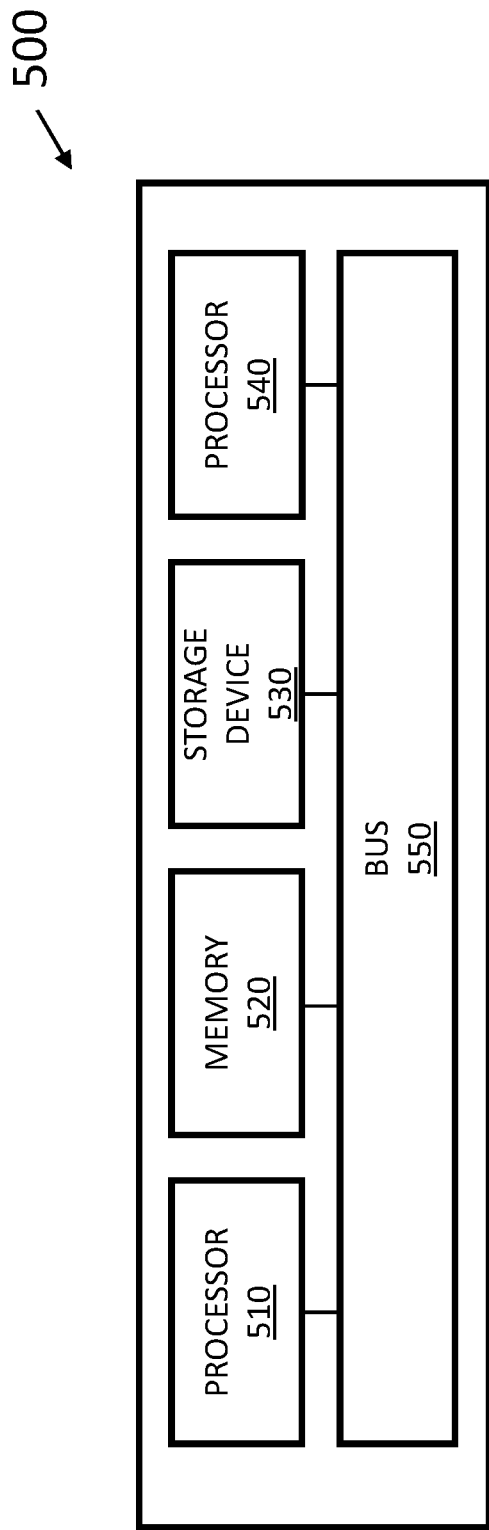
FIG. 8 depicts a block diagram illustrating a computing system consistent with some implementations of the current subject matter.

FIG. 7 depicts a block diagram illustrating a computing system 500 consistent with implementations of the current subject matter. Referring to FIGS. 1-6, the computing system 500 may be used with the data management system 100 and/or any components therein.

As shown in FIG. 7, the computing system 500 may include a processor 510, a memory 520, a storage device 530, and input/output devices 540. The processor 510, the memory 520, the storage device 530, and the input/output devices 540 may be interconnected via a system bus 550. The processor 510 is capable of processing instructions for execution within the computing system 500. The executed instructions may implement one or more components of, for example, the data management system 100. In some implementations of the current subject matter, the processor 510 may be a single-threaded processor. Alternately, the processor 510 may be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 may store data structures representing configuration object databases, for example. The storage device 530 is capable of providing persistent storage for the computing system 500. The storage device 530 may be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

Consistent with some implementations of the current subject matter, the input/output device 540 may provide input/output operations for a network device. For example, the input/output device 540 may include Ethernet ports or other networking ports to communicate with one or more wired and/or wireless networks (e.g., a local area network (LAN), a wide area network (WAN), the Internet).

In some implementations of the current subject matter, the computing system 500 may be used to execute various interactive computer software applications that may be used for organization, analysis and/or storage of data in various formats. Alternatively, the computing system 500 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities (e.g., add-ins for a spreadsheet and/or other type of program) or may be standalone computing products and/or functionalities. Upon activation within the applications, the functionalities may be used to generate the user interface provided via the input/output device 540. The user interface may be generated and presented to a user by the computing system 500 (e.g., on a computer screen monitor, etc.).

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store the machine instructions non-transitorily, such as for example as would a non-transient solid-state memory or a magnetic hard drive or any equivalent storage medium. The machine-readable medium may alternatively or additionally store the machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, the phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   receiving, by a data controller and via a frontend interface associated with an application server, a request to access data stored in a database on the data controller, the request including a web token;
   verifying, by the data controller, the web token of the request;
   providing, by the data controller and via the frontend interface, access to the data stored in the database;
   generating, by the data controller, a data access event indicating that the data stored in the database has been accessed;
   recording, by the data controller, the data access event on a blockchain platform in accordance with blockchain, wherein the blockchain platform is in remote communication with the data controller;
   receiving, by the data controller, a reporting request to generate a data access event report, the data access event report comprising a log of the data access event stored on the blockchain platform; and
   generating, by the data controller in response to the reporting request, the data access event report.

2. The system of claim 1, wherein the data access event indicates that the data has been one or more of read, modified, written, and deleted.

3. The system of claim 1, wherein the generating comprises:
   retrieving, by the data controller, the data access event from the blockchain platform; and
   retrieving, by the data controller, the data from the database that corresponds to the retrieved data access event.

4. The system of claim 3, wherein the data stored in the database on the data controller includes a data object comprising an identifier, wherein the blockchain of the data access event includes the identifier, and wherein the identifier is configured to link the data object to the corresponding data access event.

5. The system of claim 1, wherein the application server includes an application key and wherein the web token is configured to be generated by the data controller after verifying that the application key matches a stored application key that is stored on the data controller.

6. A computer-implemented method, comprising:
   receiving, by a data controller and via a frontend interface associated with an application server, a request to access data stored in a database on the data controller, the request including a web token;
   verifying, by the data controller, the web token of the request;
   providing, by the data controller and via the frontend interface, access to the data stored in the database;
   generating, by the data controller, a data access event indicating that the data stored in the database has been accessed;
   recording, by the data controller, the data access event on a blockchain platform in accordance with blockchain, wherein the blockchain platform is in remote communication with the data controller;
   receiving, by the data controller, a reporting request to generate a data access event report, the data access event report comprising a log of the data access event stored on the blockchain platform; and
   generating, by the data controller in response to the reporting request, the data access event report.

7. The method of claim 6, wherein the data access event indicates that the data has been one or more of read, modified, written, and deleted.

8. The method of claim 6, wherein the generating comprises:
   retrieving, by the data controller, the data access event from the blockchain platform; and
   retrieving, by the data controller, the data from the database that corresponds to the retrieved data access event.

9. The method of claim 8, wherein the data stored in the database on the data controller includes a data object comprising an identifier, wherein the in accordance with blockchain of the data access event includes the identifier, and wherein the identifier is configured to link the data object to the corresponding data access event.

10. The method of claim 6, wherein the application server includes an application key and wherein the web token is configured to be generated by the data controller after verifying that the application key matches a stored application key that is stored on the data controller.

11. A non-transitory computer-readable medium storing instructions, which when executed by at least one data processor, result in operations comprising:

receiving, by a data controller and via a frontend interface associated with an application server, a request to access data stored in a database on the data controller, the request including a web token;

verifying, by the data controller, the web token of the request;

providing, by the data controller and via the frontend interface, access to the data stored in the database;

generating, by the data controller, a data access event indicating that the data stored in the database has been accessed;

recording, by the data controller, the data access event on a blockchain platform in accordance with blockchain, wherein the blockchain platform is in remote communication with the data controller;

receiving, by the data controller, a reporting request to generate a data access event report, the data access event report comprising a log of the data access event stored on the blockchain platform; and generating, by the data controller in response to the reporting request, the data access event report.

12. The non-transitory computer-readable medium of claim 11, wherein the data access event indicates that the data has been one or more of read, modified, written, and deleted.

13. The non-transitory computer-readable medium of claim 11, wherein the generating comprises:

retrieving, by the data controller, the data access event from the blockchain platform; and retrieving, by the data controller, the data from the database that corresponds to the retrieved data access event.

14. The non-transitory computer-readable medium of claim 13, wherein the data stored in the database on the data controller includes a data object comprising an identifier, wherein the blockchain of the data access event includes the identifier, and wherein the identifier is configured to link the data object to the corresponding data access event.

15. The non-transitory computer-readable medium of claim 11, wherein the application server includes an application key and wherein the web token is configured to be generated by the data controller after verifying that the application key matches a stored application key that is stored on the data controller.

* * * * *